United States Patent Office 3,485,901
Patented Dec. 23, 1969

3,485,901
METHOD FOR MAKING A PRIMER CONTAINING COATED NITROCELLULOSE GRANULES
Joseph B. Quinlan, Philadelphia, Pa., assignor to the United States of America as represented by the Secretary of the Army
No Drawing. Filed Jan. 4, 1968, Ser. No. 695,591
Int. Cl. C06b 21/02
U.S. Cl. 264—3                                  9 Claims

ABSTRACT OF THE DISCLOSURE

A method of fabricating a combustible primer utilizing a solid binder comprised of single base propellant granules spray coated with an organic monomeric compound including a solvent vehicle capable of evaporating. The granules are then tumble dried, which removes the solvent vehicle, loaded into the appropriate mold, compressed, and then heated.

---

The invention described herein may be manufactured, used, and licensed by or for the Government for governmental purposes without the payment to me of any royalty thereon.

The invention relates to a method for fabricating a primer and more particularly to a method of fabrication of a solid binder combustible primer for use in caseless ammunition.

In the past, conventional liquid binders have been used in the fabrication of molded caseless propellant primer cups and other small combustible components in both 7.62 mm. and 5.56 mm. caseless ammunition. The use of the liquid binders presented the disadvantages of excess material forming on the tooling and machinery causing down time thereof, the mixing of solid propellants and liquid binders cannot be done utilizing a pelletizing method which is the most efficient way to fabricate on a mass production basis, and the hazard of excess toxic solvent from the liquid acetone and/or liquid ether is great.

It is therefore an object of the instant invention to provide a method of fabricating a primer of which avoids the aforementioned disadvantages.

Another object is the fabrication of a combustible primer in a safe and simple manner.

A further object is to provide a method of fabricating a combustible primer for caseless ammunition which is not hazardous.

The above objects as well as others together with the benefits and advantages of the invention will be apparent upon reference to the detailed description set forth below.

The primer is fabricated by the following process: Single base propellant granules are spray coated with an organic monomeric compound, such as acrylics, styrenes, or the like, plus a solvent vehicle, such as a chlorinated hydrocarbon, and tumble dried. This operation causes the individual granules of coated propellant to be free flowing in the same manner as uncoated grains. This is because the solvent vehicle which does not affect the granules, evaporates. The granules, then are volumetrically charged or loaded into a compression mold. Because of the free flowing condition, the granules are loaded without them adhering to any of the tooling or metering devices utilized. The coated granules are then compressed from between 1200 to 1500 lbs. force. The primer cup thus formed has enough strength to be handled but not enough to be utilized.

In order to achieve the proper strength the molded cup is then heated from between 120°–150° F. for between 8–24 hours causing the monomeric coating to polymerize thereby changing the monomers to long chain polymers, which then act as a dry solid binder to give the desired physical characteristics to the primer cup.

An alternative method would be to cause a bond to be formed due to cross linking rather than polymerization by using polymers, such as polyvinyl butyral/melamine formaldehyde plus a solvent vehicle, such as Freon and alcohol, in the coating step rather than the aforementioned monomers. The remaining method steps would be the same.

I claim:
1. A method of fabricating a combustible primer for use in a caseless cartridge comprising the steps of:
   providing a plurality of single base propellant granules having a single nitrocellulose explosive constituent,
   coating the outside of said granules with a coating solution of an organic monomeric compound mixed with a solvent vehicle,
   tumbling said granules to evaporate said solvent vehicle,
   volumetrically loading said coated granules into a mold cavity,
   compressing said granules, and
   heating said granules.
2. The method described in claim 1 wherein said granules are compressed between 1200–1500 lbs. force.
3. The method described in claim 1 wherein said granules are heated to a temperature of 120° F. to 150° F.
4. The method described in claim 3 wherein said granules are heated from 8 to 24 hours.
5. The method described in claim 1 wherein said compound is selected from the group consisting of acrylics and styrenes.
6. The method described in claim 5 wherein said solvent vehicle is a chlorinated hydrocarbon.
7. The method described in claim 1 wherein said coating compound becomes polymeric after heating.
8. The method described in claim 7 wherein said compound is polyvinyl butyral/melamine formaldehyde.
9. The method described in claim 8 wherein said solvent vehicle is Freon and alcohol.

References Cited
UNITED STATES PATENTS

| 2,349,048 | 5/1944 | Mackey et al. | 149—11 |
| 2,407,967 | 9/1946 | Thomson | 149—11 X |
| 3,137,741 | 6/1964 | Vondersmith et al. | 149—11 X |

CARL D. QUARFORTH, Primary Examiner
S. J. LECHART, Jr., Assistant Examiner

U.S. Cl. X.R.
86—1; 102—15; 149—11